Jan. 21, 1958  R. A. HENDRY  2,820,478
MIXING VALVE
Filed Aug. 24, 1954  2 Sheets-Sheet 1
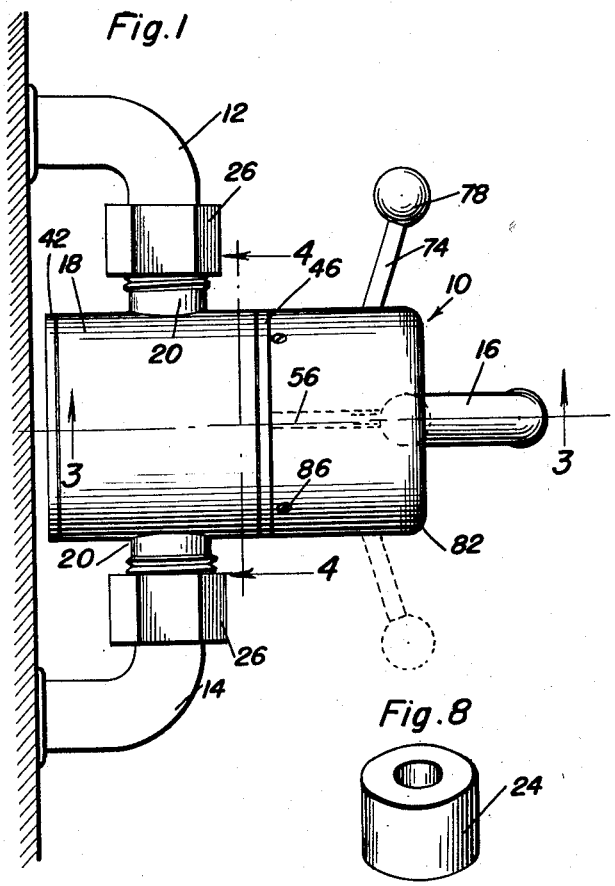
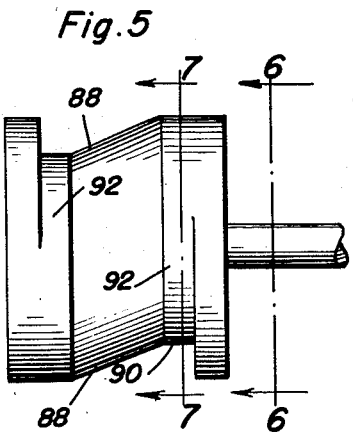
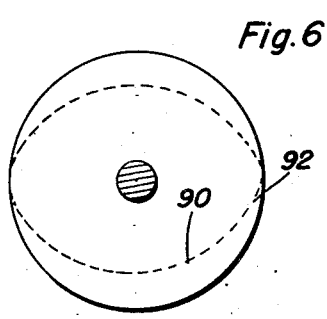
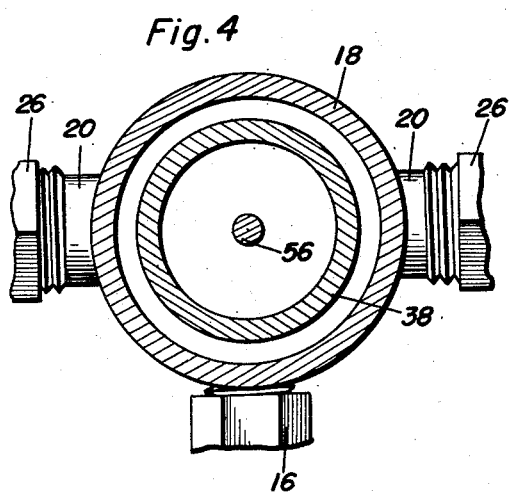
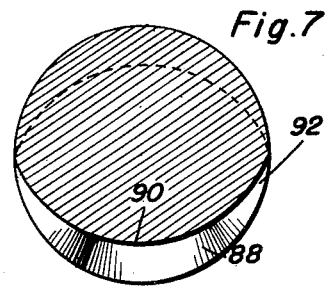
Ralph A. Hendry
INVENTOR.
BY
Attorneys Jan. 21, 1958 — R. A. HENDRY — 2,820,478
MIXING VALVE Filed Aug. 24, 1954 — 2 Sheets-Sheet 2

Ralph A. Hendry
INVENTOR.

United States Patent Office 2,820,478
Patented Jan. 21, 1958

2,820,478

MIXING VALVE

Ralph A. Hendry, Windsor, Nova Scotia, Canada

Application August 24, 1954, Serial No. 451,739

2 Claims. (Cl. 137—607)

This invention relates to a mixing valve and more specifically provides a valve for mixing hot and cold water as it discharges from a suitable supply.

An object of this invention is to provide a mixing valve for mixing hot and cold water in various proportions as it is discharged from a conventional household tap.

A further object of this invention is to provide a mixing valve having means to adjust the proportions of the mixture as well as having means for completely shutting off the liquid flow.

Another object of this invention is to provide a mixing valve for use in a conventional household tap which has an easily operated control means adjacent the discharge nozzle of the tap.

Yet another object of this invention is to provide a mixing valve having a novel cam operating means for controlling the flow of hot and cold water.

Still another object of this invention is to provide a mixing valve which is unitary in construction, provided with a housing for pleasing appearance, having minimum of moving parts and being inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing the mixing valve attached to a conventional sink having a hot water and cold water pipe and a discharge faucet;

Figure 4 is a transverse, vertical section taken substantially along section line 4—4 in Figure 1 showing details of the mixing valve housing and operating guide means;

Figure 5 is a side view of the valve actuating cam member showing details of the cam arrangement;

Figure 6 is a vertical section taken substantially along section line 6—6 of Figure 5 showing details of the cam operating member;

Figure 7 is a vertical section taken substantially along section line 7—7 of Figure 5 showing further details of the cam operating member; and Figure 8 is a perspective view of the valve seat.

Referring now more specifically to the drawings it will be seen that the numeral 10 generally designates the mixing valve of this invention connected to a hot water inlet 12 and a cold water inlet 14 and having a single discharge nozzle 16.

Figure 2:
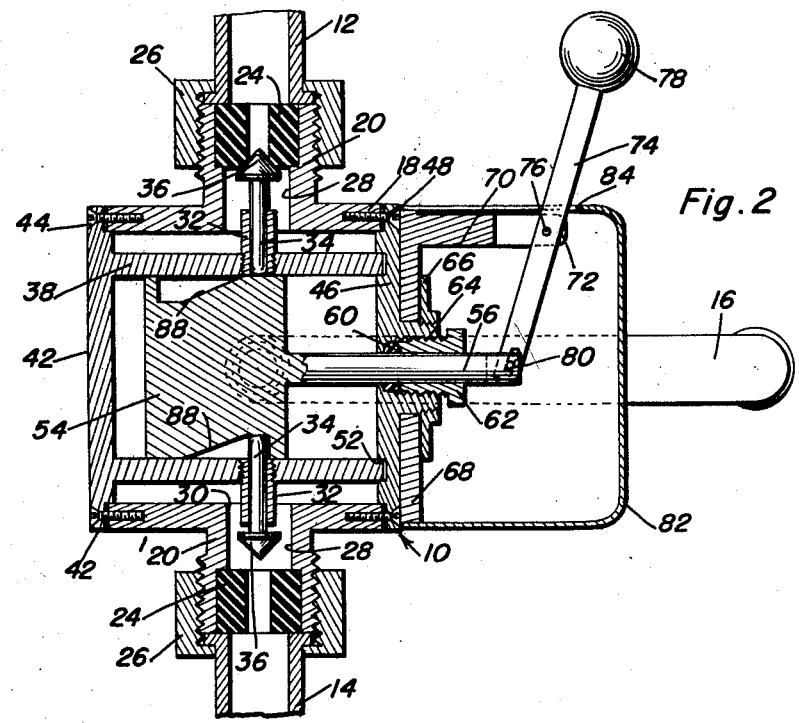
Figure 2 is a top plan section taken substantially along the center line of the hot water and cold water inlet pipes showing details of the individual valves and the valve actuating means.
Figure 3:
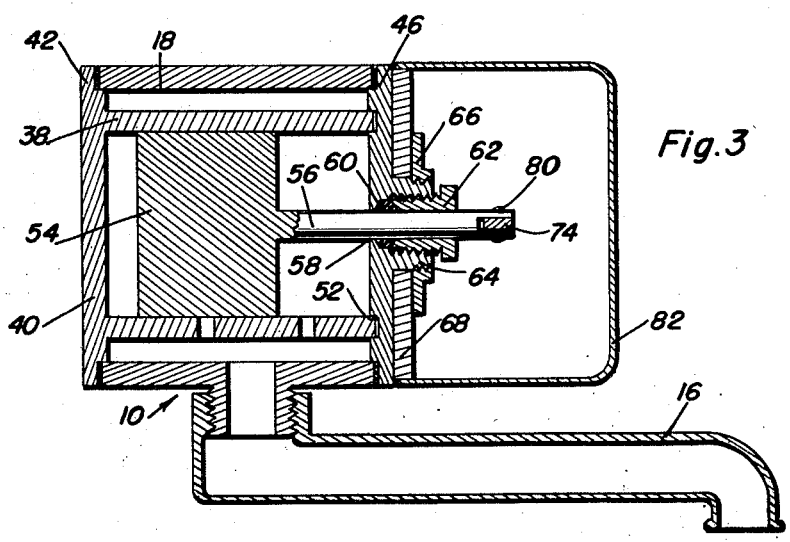
Figure 3 is a vertical section taken substantially along section line 3—3 in Figure 1 showing details of the valve operating means in conjunction with the discharge nozzle.

It will be seen that the mixing valve 10 includes a circular mixing chamber 18 having an externally threaded nipple 20 projecting from opposite sides thereof. The projecting nipple 20 is hollow and includes a shoulder member 22 therein and having a valve seat 24 seated against said member 22 and the resilient seat 24 is held in the nipple 20 by the inlet pipe 12 being secured in abutting relation to the exterior edge of the valve seat and nipple by the use of an internally threaded coupling member 26 assembling the mixing chamber 18 to the inlet pipe 12. As clearly seen from the drawings the same arrangement is used on the hot water inlet 12 and the cold water inlet 14. As best seen in Figures 2, 3 and 8 the shoulder member 22 has a passage 28 spaced from the valve seat 24 and the passage 28 is provided with a water passage and a guide sleeve 32 for slidably receiving a valve stem 34 which has a valve head 36 on its outer end having a conical face which is complementary to the valve seat 24 and when in its closed position the valve 36 interrupts the flow of water from the inlet pipe 12. Now looking at Figures 2, 3 and 4 it will be seen that the mixing chamber 18 has a tubular concentric guide member 38 secured therein wherein the guide member 38 has an end member 40 having flanges 42 which are secured to the mixing chamber 18 by conventional fastening means such as countersunk screws 44. The end member 40 and the flanges 42 act as a closure for one end of the mixing chamber 18 and as clearly seen in Figures 2 and 3 the other end of the mixing chamber 18 is closed by an end member 46 which is secured to the mixing chamber 18 by suitable screws 48.

Now looking at Figure 2 it will be seen that the valve stem 34 projects through the side walls of the guide member 38 which is provided with suitable apertures 50 and it will be understood that the valves 36 are urged inwardly from their seats 24 by the pressure of the water in the inlet conduits 12 and 14. Looking at Figures 2 and 3 it will be seen that the end closure member 46 is provided with a circular groove 52 for receiving the end of the guide member 38 thereby assuring a rigid guide member and end member structure. Slidably received in the guide member 38 and contacting the inner ends of the valve stems 34 is a reciprocating cam member 54 which is in the nature of a piston and having a rod 56 projecting therefrom and extending through an aperture 58 in the end member 46 and the rod 56 is sealed in the end member 46 by suitable packing 60 and a packing nut 62 for tightening the packing 60 thereby affording a watertight seal between the rod 56 and the end member 46. The end member 46 has a centrally located projecting nipple 64 which surrounds the aperture 58 and is internally threaded for securing the packing nut 62 therein. As best seen in Figures 2 and 3 the nipple 64 has external threads extending partially along the periphery thereof for receiving a retaining nut 66 in spaced relation to the end member 46. A rotatable member 68 fits around the unthreaded portion of the projecting nipple 64 and is held captive thereon by the retaining nut 66 thereby permitting the member 68 to rotate about the center line of the rod 56 and valve actuating member 54. Projecting from one edge of the rotating member 68 is a lug member 70 having a split end portion 72 which pivotally supports an operating handle 74 on a pivot pin 76. One end of the operating handle 74 has a gripping knob 78 and the opposite end of the operating handle 74 is pivotally and slidably connected to the end of the rod 56 by the use of a pin and slot connection 80 as best shown in Figure 2. A housing member 82 having a slot 84 in one edge thereof is secured to the rotating member 68 with the slot 84 receiving the shank of the operating handle 74 and the housing 82 is detachably secured to the rotating member 68 by the use of suitable fastening means 86.

Now referring specifically to Figures 2 and 5–7 it will be seen that the cam valve actuating member 54 has cam surface 88 formed by a cylinder having a longitudinal axis inclined in relation to the rotational axis of the actuating member 54 with the ends of the cylindrical member being disposed in a plane perpendicular to the rotational axis of the actuating member 54 and in angular relation to the longitudinal axis of the cylindrical member thereby forming an inclined cam surface between the cam portions 90 and 92. One half of the cam surface 90 or 92 is semi-cylindrical and equally diametric to the end portions or the entire member 54 with the other portion of the cam members 90 and 92 forming a cam portion which is merged with the adjacent surface of the cylindrical member forming the cam surface 88. Due to the inclined longitudinal axis of the cylindrical portion which is disposed centrally between the cams 90 and 92, rotation of the cylindrical surface about the rotational axis which is in an inclined relation to the longitudinal axis will cause a cam surface to be generated around the rotational axis for varying the position of the valve stems and valves upon reciprocation of the member 54 or rotation thereof and also the cam members 90 and 92 permit full closing of both of the valve members at either extreme position of the member 54.

The operation of the device will be readily understood. With the cam member 54 in the position as shown in Figure 2 cold water will naturally flow from the inlet 14 out through the discharge nozzle 16 as the handle 74 and knob 78 are pushed inwardly the cam member 54 is pulled towards the end member 46 thereby opening the valve 36 in the hot water inlet 12 and permitting warm water to be mixed with the cold water and discharged through the nozzle 16. As will be apparent by manipulation of the handle 74 the proportionate rate of flow of the hot and cold water may be minutely adjusted. With the valve actuating member 54 pulled completely over towards the end member 46 the cold water valve 36 is completely closed and the hot water valve is completely opened. Both of the valves 36 may be closed thereby preventing flow of both hot and cold water by grasping the handle 74 and rotating the housing 82, the rod 56 and the cam member 54 through a 90° arc and the cam members 92 will engage the valve stems 34 and urge them outwardly as the valve stems 34 ride up the cam 92 until the cam lobe is the same diameter as the over-all diameter of the operating member 54. When necessary the fastening means 86 may be removed and the housing 82 separated from the rotatable member 68 thereby providing access to the packing nut 62 to tighten the packing 60 thereby assuring a watertight seal around the shaft 66. Obviously, the end members 40 and 46 may be easily removed by the removal of fastening means 44 and 48 thereby permitting the easy disassembly and repair or replacement of parts as may become necessary during extended use. Obviously, the valve handle 74 and knob 78 may be rotated to any position around the axis of the rod 56 and at two positions around the axis the valves 36 will be in closed position and at other positions of the handle 74 the valves 36 will be opened or closed depending upon the actuation of the handle member 74 and the relative temperatures of the inlet hot and cold water and the temperature desired of the water which is discharged from the nozzle 16. The mixing valve may be made of any suitable material and it is preferably stainless steel or chrome plated to match the usual fixtures in household plumbing and the various nipples and threaded members preferably conform to the standard sizes and pitch as accepted in the plumbing trade.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A mixing valve comprising a hollow mixing chamber having a pair of inlets and an outlet, one of said inlets connected to a hot water supply and the other inlet connected to a cold water supply, a valve seat of resilient material positioned in each of said inlets, a pair of valve guides mounted in said chamber in alignment with said valve seats, a pair of valves respectively and selectively engaging each of said seats, each of said valves having a stem slidably received in one of said valve guides, cam means slidably and rotatably mounted in said mixing chamber in contact with the inner ends of said valve stems for varying the relative positions of the valves and valve seats, said cam means including a body member having concentric cylindrical end portions, a cylindrical central portion having a longitudinal axis inclined in relation to the rotational axis of the end portions, and a pair of eccentric portions respectively interconnecting the ends of said cylindrical central portion and said cylindrical end portions, said cylindrical central portion and said eccentric portions engaging the inner ends of said valve stems for adjusting the position of said valves in relation to the seats during rotation and sliding movement of the cam means, and handle means connected with the cam means for rotating and sliding said cam means, each of said eccentric portions having a semi-cylindrical portion and a cam portion with the respective semi-cylindrical portions disposed at diametrically opposed points relative to the central cylindrical portion, the semi-cylindrical portions completely closing the respective valves when engaged with the valve stems with diametrically arranged ends of either semi-cylindrical portion closing both of said valves when engaged with the stems, the cam portions permitting opening of the respective valves when the stem is engaged therewith, the surface of the cylindrical central portion being cylindrical about its longitudinal axis and inclined in relation to the rotational axis thereof thereby forming a cam surface between the eccentric portions for varying the positions of the valves in response to reciprocation of rotation thereof.

2. The structure as defined in claim 1 wherein said mixing chamber is provided with a cylindrical guide member rotatably engaging the cylindrical end portions of said body member, said valves facing the stream of water whereby the force of the water will move the valves inwardly, said eccentric portions being disposed at diametrically opposed points on said body member and extending around no more than one-half of the periphery of said body member thereby permitting adjustment of said valves from a fully open to a fully closed position.

References Cited in the file of this patent

UNITED STATES PATENTS

| | | |
|---|---|---|
| 1,371,795 | Logan | Mar. 15, 1921 |
| 2,301,439 | Moen | Nov. 10, 1942 |
| 2,525,313 | Putnam | Oct. 10, 1950 |
| 2,616,710 | Woodruff | Nov. 4, 1952 |